J. NEFF, Sr.
PNEUMATIC WHEEL TIRE.
APPLICATION FILED FEB. 20, 1909.
932,310.
Patented Aug. 24, 1909.
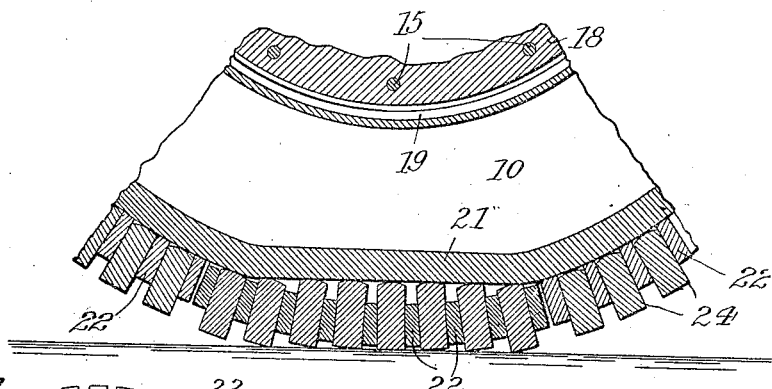
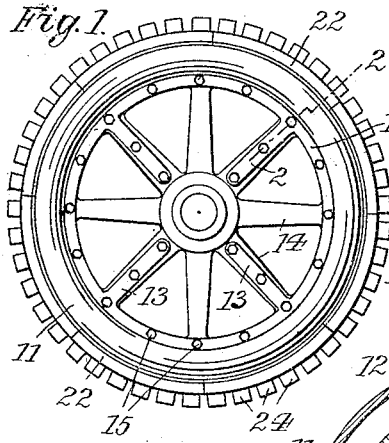
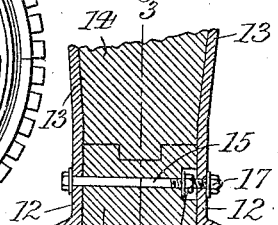
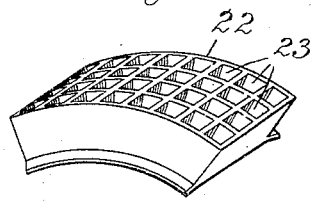
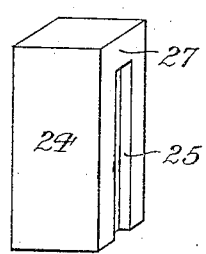
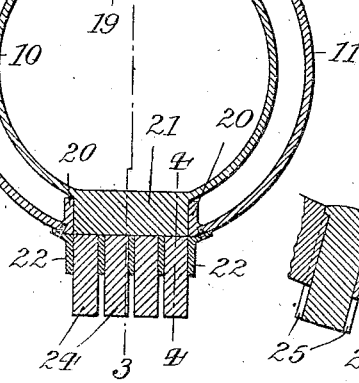
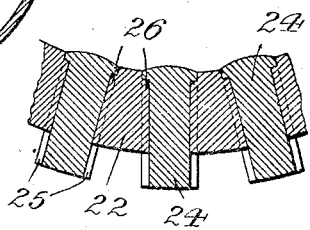
Witnesses:
Arthur E. Gruppe.
W. R. Schulz
Inventor
John Neff, Sr.
By his Attorney

UNITED STATES PATENT OFFICE.

JOHN NEFF, SR., OF WEST HOBOKEN, NEW JERSEY.

PNEUMATIC WHEEL-TIRE.

932,310. Specification of Letters Patent. Patented Aug. 24, 1909.

Application filed February 20, 1909. Serial No. 479,249.

*To all whom it may concern:*

Be it known that I, JOHN NEFF, Sr., a citizen of the United States, residing at West Hoboken, Hudson county, State of New Jersey, have invented new and useful Improvements in Pneumatic Wheel-Tires, of which the following is a specification.

This invention relates to a pneumatic wheel tire which is durable, not liable to skid, and effectively protects the air tube against punctures.

In the accompanying drawing: Figure 1 is a side view of a wheel provided with my improved tire; Fig. 2 an enlarged section on line 2—2, Fig. 1; Fig. 3 a section on line 3—3, Fig. 2 showing the abutting segmental casings spaced slightly for the sake of clearness; Fig. 4 a section on line 4—4. Fig. 2 showing the curvature of the wheel on an exaggerated scale; Fig. 5 a perspective view of one of the shoe-holding casings, and Fig. 6 a perspective view of one of the shoes.

The pneumatic tube 10 is inclosed within a rigid tubular housing composed of a pair of substantially semi-tubular sections 11. Each section 11 is integral at its base with a circular flange 12 provided with a number of radial arms 13 that extend along some of the spokes 14. Flange 12 and arms 13 are secured to the wheel by bolts 15 carrying nuts 16, 17. Of these, nuts 16 are countersunk into wheel-rim 18, or spokes 14, while nuts 17 bear directly against flange 12, or arms 13 of one of the sections 11. Thus by unscrewing nuts 17, one half of the housing may be removed without displacing the other half. This other half may, however, also be removed whenever desired by subsequently unscrewing nuts 16. At its inner side, housing 11 is made integral with a concave seat 19 for accommodating tube 10, said seat extending over wheel rim 18. At its circumference, housing 11 is provided with a pair of inwardly extending spaced flanges 20, that flank a squared head 21 projecting outwardly from tube 10. Head 21 is encompassed by a number of segmental casings 22 which are screwed to housing 11 and extend along the entire tread of the wheel. Each casing is reticulated, being provided with a number of intersecting tapering partitions forming longitudinal rows of radial openings 23, four of such rows being shown. Within each opening is received a radially movable shoe 24 which is adapted to bear directly against head 21 and projects some distance outwardly beyond casing 22. Shoes 24 are so connected to casing 22, that they have a limited radial movement within openings 23. To this effect each shoe 24 is provided along opposite sides with longitudinal grooves 25 engaging keys 26 of casing 22 and closed at their inner ends as at 27, so that the outward movement of the shoes is restricted.

In use, the shoes will be pushed inwardly by contact with the ground, and will cause a play of head 21 between flanges 20. In this way the desired yielding tread is insured, while skidding is prevented and the inflation tube is effectively protected against punctures.

I claim:

1. A wheel tire comprising an inflation tube having an outwardly extending integral head, a tubular housing surrounding said tube and having a pair of inwardly extending flanges flanking said head, a reticulated casing secured to the housing and having a series of intersecting tapering partitions to form intervening radial openings, and shoes slidably held within said openings and engaging the head.

2. A device of the character described comprising a wheel, an inflation tube, a divided surrounding housing having arms extending along the wheel-spokes, bolts engaging said arms and spokes, and a pair of nuts engaging each of said bolts, one of said nuts being countersunk within its spoke.

Signed by me at New York city, (Manhattan,) N. Y., this 19th day of February, 1909.

JOHN NEFF, SR.

Witnesses:
W. R. SCHULZ,
FRANK V. BRIESEN.